Jan. 31, 1967    B. L. YORK    3,300,798
BLIND SEALING RIVET AND METHOD OF MAKING THE SAME
Filed March 10, 1964    2 Sheets-Sheet 1
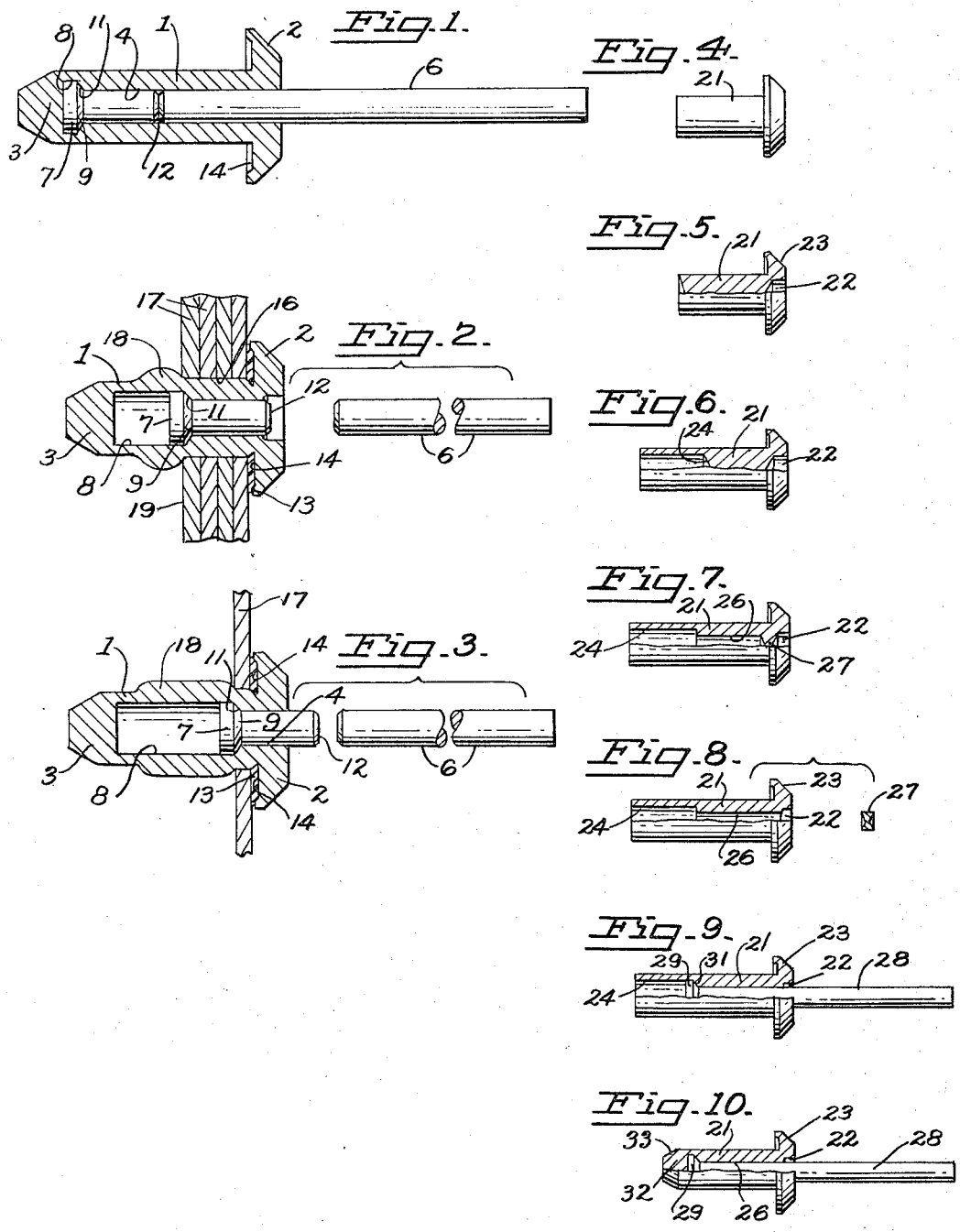
INVENTOR.
BILL LEE YORK
BY George B. White
ATTORNEY Jan. 31, 1967 B. L. YORK 3,300,798
BLIND SEALING RIVET AND METHOD OF MAKING THE SAME
Filed March 10, 1964 2 Sheets-Sheet 2
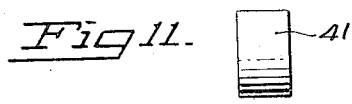
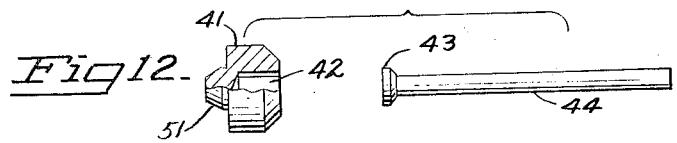
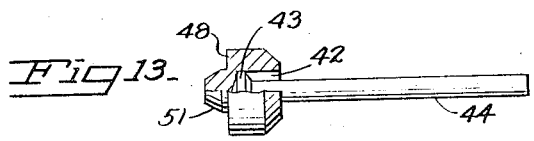
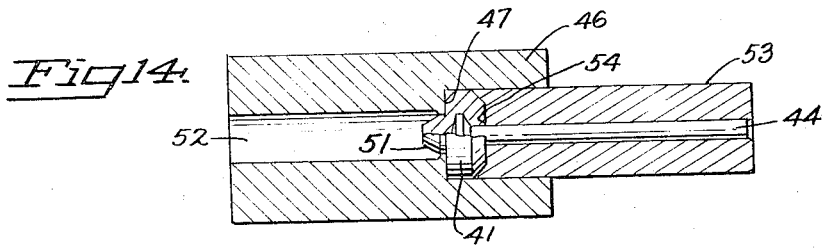
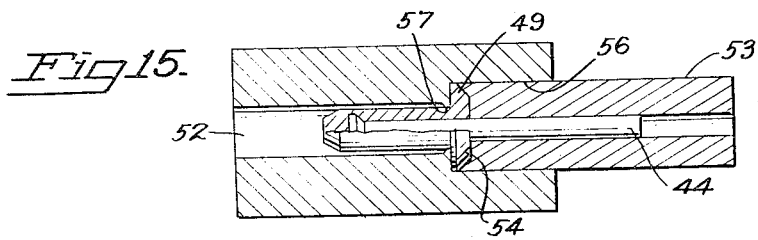
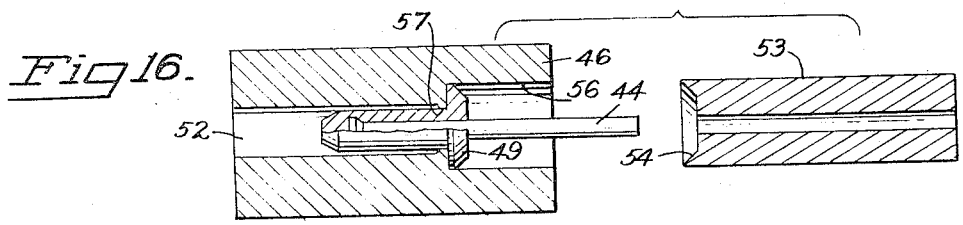
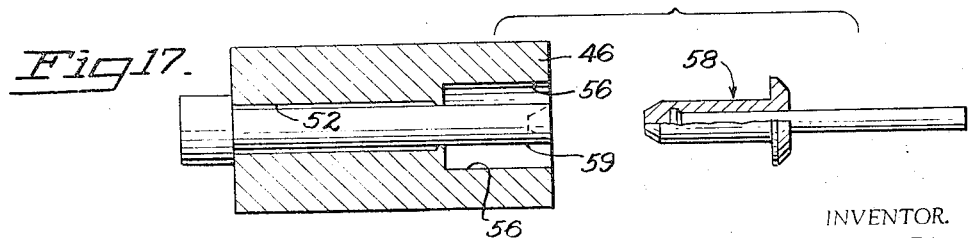
INVENTOR.
BILL LEE YORK
BY George B White
ATTORNEY

United States Patent Office 3,300,798
Patented Jan. 31, 1967

1

3,300,798
BLIND SEALING RIVET AND METHOD OF
MAKING THE SAME
Bill Lee York, Costa Mesa, Calif., assignor to Textron
Industries, Inc., a corporation of Delaware
Filed Mar. 10, 1964, Ser. No. 350,827
3 Claims. (Cl. 10—27)

This invention relates to a blind sealing rivet and method of making the same.

The invention here is particularly an improvement on the type of blind rivets where a stem is extended through a tubular rivet with a tail former for expanding the tubular rivet when pulled by the stem while pressure is exerted against the head of the rivet, thereby to clinch the work, fill the hole in the work, and set the rivet.

The primary object of this invention is to provide a rivet with a closed end which will not leak through the central core portion. Another object is to provide a rivet which can be effectively sealed under the rivet head as well as assuring complete filling of the hole.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a sectional view of the rivet assembly inserted in the work.

FIG. 2 is a sectional view of the rivet of FIG. 1 set.

FIG. 3 is a sectional view of the same rivet assembly set in a thinner wall.

FIGS. 4–10 illustrate the steps of a method for making said rivet assembly.

FIGS. 11–17 illustrate the steps of a modified method for making said rivet assembly.

The article produced by the method herein is shown in FIG. 1 and it includes a generally tubular rivet 1 with a head 2 at one end and an integral closure wall 3 at its other end so as to enclose the cavity 4 of the tubular rivet 1 at its blind end. A stem 6 filling the cavity 4 of the tubular rivet 1 extends beyond the rivet head 2. The former head 7 on the inner end of the stem 6 is embedded in an enlarged cavity 8 adjacent the closed end 3 of the tubular rivet so that the frusto-conical connecting portion 9 between the head 7 and the stem 6 bears against a shoulder 11 of the enlarged cavity 8. The stem 6 has a breakneck groove 12 thereon spaced from the head 7. Usually a sealing gasket or ring 13 is placed in a corresponding recess 14 in the base of the rivet head 2 for further sealing.

In operation the rivet is first placed through holes 16 of the work such as plate 17. Pressure is applied to the head 2 of the rivet and the stem 6 is pulled by a tool and in the manner shown in Patent No. 2,183,543.

The pulling of the stem will force the frusto-conical connecting portion 9 against the shoulder 11 and will force the material of the tubular rivet axially and outwardly so as to expand the tubular rivet against the sides of the holes 16 and also to force the material outwardly to form a blind head 18 which bears against the blind side 19 of the work for clinching the work together and setting the rivet.

This type of rivet is eminently adapted for accomplishing sealing irrespective of the thickness of the work or wall or number of plates through which the rivet is inserted or used.

For instance as shown in FIG. 3 the rivet can be used effectively on a comparatively thin wall 17 and in that case the blind head 18 is proportionately elongated, but it still forms an effective tail as well as seal of the stem. Thus the loosening and loss of the stem from the rivet is prevented.

The tubular rivet may be made of any material suitable for forming in the manner described.

A method of making this rivet is illustrated in FIGS. 4 to 10 inclusive. As shown in FIG. 4 there is a rivet blank 21. There is a short hole 22 punched or bored in the middle of the head of the blank 21. Then an enlarged bore or recess 24 is formed in the tail end of the blank 21. Thereafter a hole or passage 26 is punched or extruded from the enlarged recess 24 to near the juncture of the head 23. Thereafter a punch is forced through the head 23 so as to remove a small plug of material 27 and thus form a suitable passage for a rivet stem 28. The former head 29 of the stem 28 bears against the shoulder 31 of the enlarged recess 24. Finally the recess 24 beyond the former head 29 is collapsed and formed solidly against the former head 29 into a closed end wall 32, preferably with a frusto-conical entrance periphery 33. In this manner the rivet head is locked so that the assembly can be inserted for the performing of the operations illustrated in FIGS. 1, 2 and 3.

Another method of making this rivet is illustrated in FIGS. 11 to 17 inclusive. In this form there is a cylindrical blank 41 as shown in FIG. 11. Then in the blank there is formed an enlarged recess 42 substantially fitting the tail former 43 of a prefabricated stem 44. This blank may be formed by screw machine operation or by forming from wire on a header. Then the head 43 of the prefabricated stem 44 is inserted in the enlarged recess 42 as shown in FIG. 13. Then the blank 41 is extruded and so formed as to close the recess around the forming head 43 and completely confine the latter. In the form shown in FIG. 14 this closing of the recess 42 around the forming head 43 is performed by placing the assembly in a die 46 as shown in FIG. 14. A shoulder 47 of this die engages a shoulder 48 on the blank which ultimately is to correspond with the underside of the completed rivet head 49 as shown in FIG. 15. The blank 41 is formed with a frusto-conical end 51 which projects into the cavity 52 of the die. Then a punch 53 is placed over the stem. The inner end of the punch is provided with a recess 54 corresponding to the ultimate shape of the rivet head 49. The die has a cavity 56 extended from the shoulder 47 to the adjacent end of the die. The recess 56 is of the same diameter as the outer diameter of the blank 41 or the head 49. The cavity 52 of the die is somewhat larger than the rivet diameter, except at its throat 57 which is of the same diameter as the proposed diameter of the rivet. Pressure is exerted on the punch 53 and the recess 54 closes the top of the blank around the stem and around the former head 43 as illustrated in FIG. 14. Then additional pressure is applied axially to the punch 53 which forces the material of the blank to be extruded through the die extension and into the die cavity 52 carrying with it the stem 44 as shown in FIG. 15. Then the punch 53 is withdrawn from the die 46 as shown in FIG. 16. Finally the completely assembled rivet 58 is ejected from the die by a suitable ejector pin 59.

I claim:
1. In a method of making a blind sealing rivet, the steps of

(a) forming a blank tubular rivet with an enlarged recess in its tail open at its tail end and formed with a shoulder at its inner end
(b) inserting a pulling stem for setting the rivet entirely through said tubular rivet blank
(c) providing a former on the tail end of the pulling stem bearing against the shoulder of said enlarged recess for compacting and expanding the material of said tubular blank beyond said shoulder when said stem is pulled thereby to set the rivet and
(d) sealing the tail end of the recess so as to confine said former completely surrounded in said recess.

2. In a method of making a blind sealing rivet, the steps as defined in claim 1, and
(e) forming said former of about the same outer diameter as the inner diameter of said enlarged recess.

3. In a method of making a blind sealing rivet, the steps of
(a) forming a blank tubular rivet with an enlarged recess in its tail open at its tail end and formed with a shoulder at its inner end
(b) inserting a pulling stem for setting the rivet entirely through said tubular rivet blank
(c) providing a former on the tail end of the pulling stem for setting the rivet entirely bearing against the shoulder of said enlarged recess for compacting and expanding the material of said tubular blank beyond said shoulder when said stem is pulled thereby to set the rivet and
(d) compacting the tail end of said blank against said former so as to completely surround said former.

References Cited by the Examiner

UNITED STATES PATENTS

| | | | |
|---|---|---|---|
| Re. 24,363 | 10/1957 | Curtis | 10—27 |
| 2,054,629 | 9/1936 | Huck et al. | 10—27 |
| 2,344,128 | 3/1944 | Cherry et al. | 85—77 |
| 2,385,831 | 10/1945 | Mullgardt | 10—27 |
| 2,586,336 | 2/1952 | Huck | 10—27 |
| 3,136,204 | 6/1964 | Reynolds | 85—77 |

FOREIGN PATENTS

| | | |
|---|---|---|
| 603,182 | 8/1960 | Canada. |
| 917,238 | 9/1946 | France. |
| 1,069,718 | 2/1954 | France. |
| 594,859 | 11/1947 | Great Britain. |

ANDREW R. JUHASZ, *Primary Examiner.*

CARL W. TOMLIN, *Examiner.*

M. PARSONS, JR., L. B. TAYLOR, *Assistant Examiners.*